Figure 4:
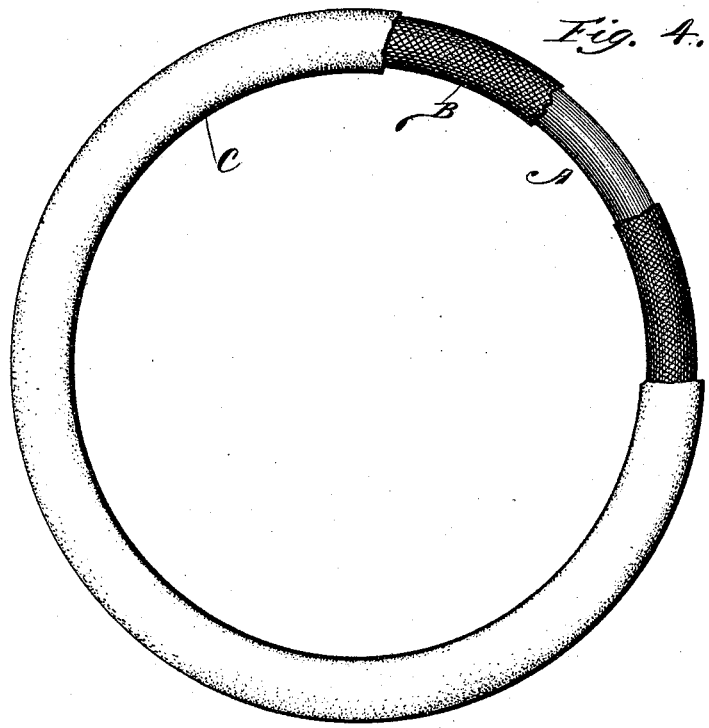

(No Model.) 3 Sheets—Sheet 1.
F. W. MORGAN & R. WRIGHT.
MANDREL FOR PNEUMATIC TIRES.
No. 496,321. Patented Apr. 25, 1893.
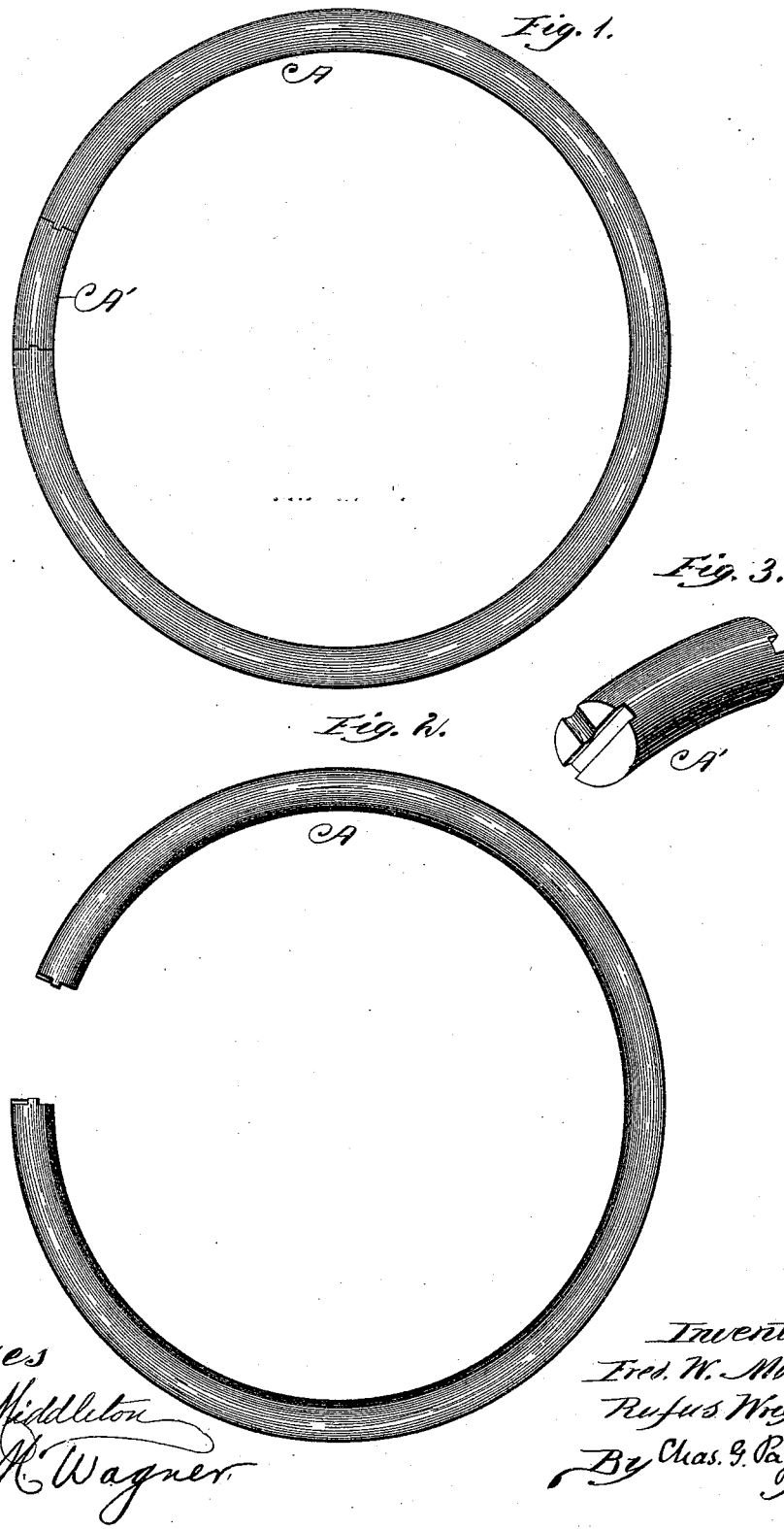

(No Model.) 3 Sheets—Sheet 2.

F. W. MORGAN & R. WRIGHT.
MANDREL FOR PNEUMATIC TIRES.

No. 496,321. Patented Apr. 25, 1893.

Witnesses
W. D. Middleton
Reta M. Wagner

Inventors
Fred. W. Morgan
Rufus Wright
By Chas. G. Page
Atty (No Model.) 3 Sheets—Sheet 3.

F. W. MORGAN & R. WRIGHT.
MANDREL FOR PNEUMATIC TIRES.

No. 496,321. Patented Apr. 25, 1893.

Witnesses
W. R. Middleton
Reta M. Wagner

Inventors
Fred W. Morgan
Rufus Wright
By Chas. G. Page
Atty.

UNITED STATES PATENT OFFICE.

FRED W. MORGAN AND RUFUS WRIGHT, OF CHICAGO, ILLINOIS.

MANDREL FOR PNEUMATIC TIRES.

SPECIFICATION forming part of Letters Patent No. 496,321, dated April 25, 1893.

Application filed December 24, 1892. Serial No. 456,204. (No model.)

*To all whom it may concern:*

Be it known that we, FRED W. MORGAN and RUFUS WRIGHT, both citizens of the United States, residing at Chicago, in the county of Cook and State of Illinois, have invented a certain new and useful Improvement in Mandrels for Pneumatic Tires, of which the following is a specification.

In manufacturing hollow or pneumatic tires in accordance with Letters Patent of the United States No. 490,035, granted and issued to us January 17, 1893, and containing a clause of reservation in favor of the invention of our present application, we provide an annular mandrel and prepare or arrange thereon the materials or layers which are to form the sheath, and we then place the whole within a mold and subject to pressure and vulcanization so as to form upon the mandrel a seamless annular tire sheath. We then open or split the sheath to a limited extent over the mandrel at a point where the latter can be opened or separated and then separate the mandrel at such point and strip the sheath from the mandrel which latter emerges from the sheath by the way of said limited split or opening. In this way we are enabled to provide a seamless molded sheath having at a point in its base or seating portion a limited split or opening which is only of sufficient size, first to permit the removal of the sheath from the mandrel, and next to permit the introduction of an air tube. After the air tube has been introduced within the sheath, we lace or otherwise suitably close the split or opening and by reason of the limited length of the latter, we are enabled to employ a limited extent of lacing or other fastening means, and hence economize in time and weight.

Our present application relates to the aforesaid mandrel and consists in an annular mandrel adapted for the formation of endless, seamless tire tubes or sheaths and separable at a point along its annular line so as to permit the tubular sheath, after being split or opened opposite such point, to be removed from the mandrel.

As an exceedingly practical and preferred construction we form the mandrel with a short removable section which can be readily removed by way of the short split or opening in the sheath preparatory to stripping the latter from the mandrel.

Other ways within the range of possibility, are hereinafter described, but we regard the provision of a mandrel having a removable section as best and most practical, and as constituting a matter of specific improvement.

Figure 5:
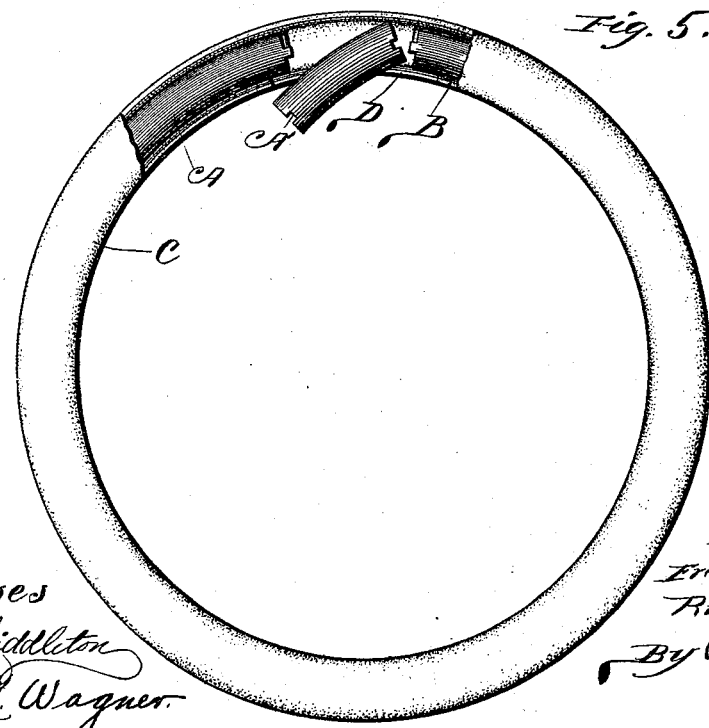
Figure 6:
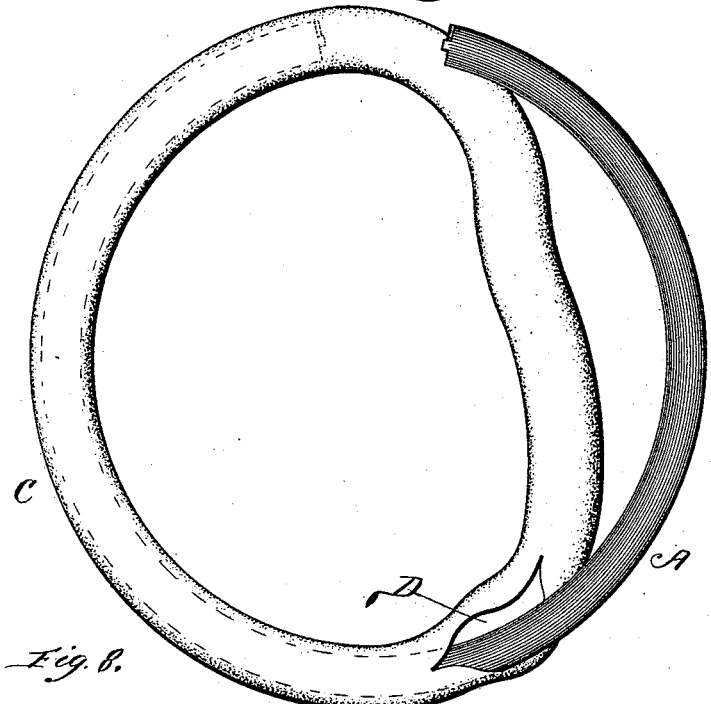
Figure 8:
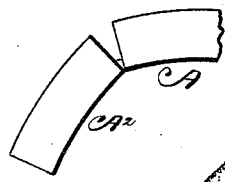
Figure 7:
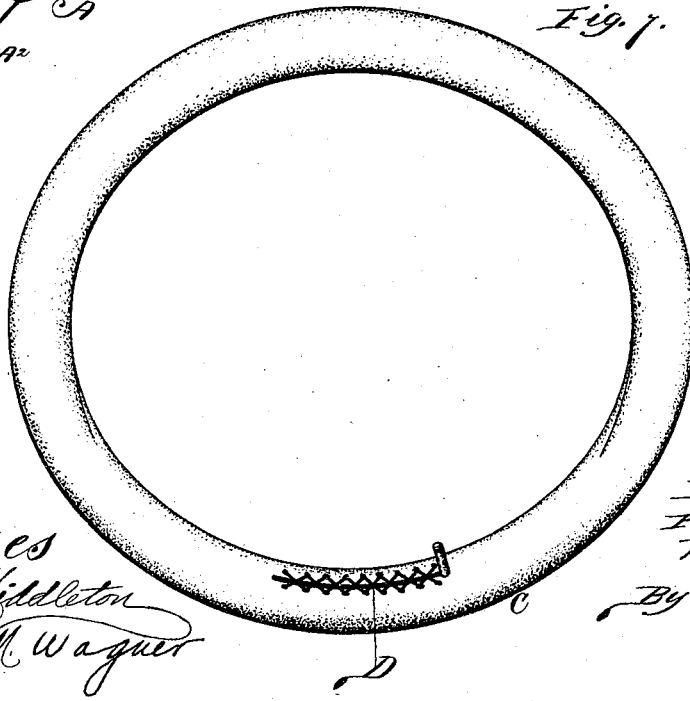

In the accompanying drawings,—Figure 1 represents the annular mandrel having a removable section in accordance with our invention. Fig. 2 represents the mandrel with its detachable section removed. Fig. 3 represents said detachable section. Fig. 4 represents the sheath as formed upon the mandrel, portions of the sheath being broken away so as to illustrate its structure. Fig. 5 is a section through the sheath and mandrel, and illustrates the way in which the detachable or removable mandrel section is taken out through the slit or opening in the sheath. Fig. 6 illustrates the way in which the sheath is stripped from the mandrel after the detachable mandrel section has been removed. Fig. 7 illustrates the completed tire. Fig. 8 illustrates a portion of the mandrel having a hinged section.

In preparing a tire sheath, we may for example first place upon the circular mandrel A, a layer B of canvas, and then place upon the layer of canvas, the outer layer C of rubber. The mandrel thus covered is then placed within a mold and its covering subjected to pressure, and also to vulcanization, in which way the rubber covering will form an endless, seamless, tube. We then make a short slit D through the sheath and open or separate the mandrel at such point, and then strip the sheath from the mandrel as in Fig. 7.

As a preferred construction, the circular mandrel A is formed with a removable section A' which when in place has its ends connected with the terminals of the remaining portion of the mandrel by tongue and groove joints. By such arrangement the section A' can be temporarily locked in place, it being observed that we prefer to form the section with relation to the remaining portion of the mandrel so that in order to permit the removal of such detachable section it will be necessary to spring the mandrel slightly open or apart at the point where the detachable section occurs. We do not however for the broader purposes of this application confine ourselves to any particular form of joint between the detachable mandrel section and remaining portion of the mandrel, and while, as hereinbefore stated, we prefer the detachable section and regard the same as a special matter of improvement we desire to herein broadly cover a circular mandrel which is separable at a point suitable for the within described purpose whether such separation be effected by removing a section of the mandrel, as hereinbefore described, or by swinging to one side a portion or section of the mandrel, for example as in Fig. 8 wherein the mandrel has a hinged section $A^2$ which can be swung to one side, and which therefore can be swung out through the said slit or opening after the same has been made through the sheath.

The way in which the detachable mandrel section can be removed through the slit or opening, is illustrated in Fig. 5, and the way in which the sheath is stripped from the mandrel after said section has been detached is illustrated in Fig. 6, it being understood that in order to permit the sheath to be thus stripped from the mandrel, one end of the latter can be held in a vise or like clamp.

Where we split the tire sheath to a short extent along its base or seating portion, the detachable or movable mandrel section will be moved toward the center of the circle described by the mandrel, but we may in place of splitting the sheath along its base or seating portion, open the same along its side or along its tread and after removing the mandrel through the opening thus formed, suitably close such opening, and in such case, the mandrel section will be removed or swung out in conformity with the location of the opening.

Various advantages involved in the manufacture of tires upon the herein described mandrel are fully set forth in our said Letters-Patent, and in our application for Letters-Patent of the United States, Serial No. 450,068, filed October 26, 1892, we have claimed the tire thus made as an article and have further set forth the advantages of the same.

What we claim as our invention is—

1. A circular mandrel for the purpose set forth adapted to open or separate at a point along its annular line so as to permit a tubular seamless tire sheath to be formed thereon and then stripped from the mandrel substantially as described.

2. A circular mandrel for the purpose set forth having a removable section whereby a tubular seamless tire sheath can be formed upon the mandrel and then removed therefrom, substantially as described.

FRED W. MORGAN.
RUFUS WRIGHT.

Witnesses:
CHAS. G. PAGE,
W. D. MIDDLETON.